(12) United States Patent
Li et al.

(10) Patent No.: US 11,161,106 B2
(45) Date of Patent: Nov. 2, 2021

(54) PREPARATION METHOD OF DENITRATION CATALYST WITH WIDE OPERATING TEMPERATURE RANGE FOR FLUE GAS

(71) Applicant: TSINGHUA UNIVERSITY, Beijing (CN)

(72) Inventors: Junhua Li, Beijing (CN); Lina Gan, Beijing (CN); Yue Peng, Beijing (CN); Shuangjiang Yu, Beijing (CN); Dong Wang, Beijing (CN); Jianjun Chen, Beijing (CN)

( * ) Notice: Subject to any disclaimer, the term of this patent is extended or adjusted under 35 U.S.C. 154(b) by 268 days.

(21) Appl. No.: 16/332,984

(22) PCT Filed: Sep. 28, 2017

(86) PCT No.: PCT/CN2017/103834
§ 371 (c)(1),
(2) Date: Mar. 13, 2019

(87) PCT Pub. No.: WO2018/233129
PCT Pub. Date: Dec. 27, 2018

(65) Prior Publication Data
US 2019/0224663 A1    Jul. 25, 2019

(30) Foreign Application Priority Data
Jun. 22, 2017   (CN) .......................... 201710481159.3

(51) Int. Cl.
| | | |
|---|---|---|
| *B01J 37/00* | (2006.01) | |
| *B01J 21/06* | (2006.01) | |
| *B01J 23/22* | (2006.01) | |
| *B01J 23/30* | (2006.01) | |
| *B01J 37/08* | (2006.01) | |
| *B01J 23/00* | (2006.01) | |
| *B01D 53/86* | (2006.01) | |

(52) U.S. Cl.
CPC ........ *B01J 37/086* (2013.01); *B01D 53/8628* (2013.01); *B01J 21/063* (2013.01); *B01J 23/002* (2013.01); *B01J 23/22* (2013.01); *B01J 23/30* (2013.01); *B01J 37/0036* (2013.01); *B01J 37/0063* (2013.01); *B01D 2251/2062* (2013.01); *B01D 2255/20707* (2013.01); *B01D 2255/20723* (2013.01); *B01D 2255/20776* (2013.01); *B01D 2257/406* (2013.01); *B01D 2258/0283* (2013.01); *B01J 2523/00* (2013.01); *B01J 2523/47* (2013.01); *B01J 2523/55* (2013.01); *B01J 2523/69* (2013.01)

(58) Field of Classification Search
None
See application file for complete search history.

(56) References Cited

U.S. PATENT DOCUMENTS

| | | | | |
|---|---|---|---|---|
| 4,171,347 | A * | 10/1979 | Hass | ...................... C01B 17/508 423/539 |
| 2009/0142242 | A1 * | 6/2009 | Hong | ....................... B01J 23/34 423/239.1 |
| 2014/0105803 | A1 * | 4/2014 | Hong | ................... B01D 53/565 423/239.1 |
| 2016/0136616 | A1 * | 5/2016 | Yoshimura | ........... B01J 37/0009 502/309 |

OTHER PUBLICATIONS

Kamata, Hiroyuki "The Role of K2O in the Selective Reduction of NO with NH3 . . . ". Journal of Molecular Catalysis A.: Chemical 139., 189-198 (1999). (Year: 1999).*

* cited by examiner

*Primary Examiner* — Sheng H Davis
(74) *Attorney, Agent, or Firm* — Novoclaims Patent Services LLC; Mei Lin Wong

(57) ABSTRACT

The invention discloses a preparation method and application of a denitration catalyst with wide operating temperature for flue gas, which utilizes an organic vanadium compound as a vanadium precursor, and titanium dioxide powder or titanium tungsten powder as a carrier, and is prepared by mechanical ball milling method and heat treatment to obtain a catalyst, which denitration of fixed source flue gas under wide temperature range. Compared with the existing arts, the present invention includes minor modifications to the traditional vanadium tungsten titanium catalyst system and adopts the mechanical ball milling method, the activity and resistance to sulfur and water poisoning are improved significantly, thus providing a preparation technology of SCR denitration powder catalyst which is green, highly efficient, low cost and simple in operation. Through the interaction of the organic vanadium precursor with the carrier, the vanadium surface atom concentration of the catalyst is higher, the species of polymeric vanadium is more, and the vanadium oxide is more easily reduced, thereby obtaining higher denitrification activity at low temperature. The denitration catalyst of the present invention has relatively higher activity at 200-450° C. while having good resistance to sulfur and water poisoning.

1 Claim, 1 Drawing Sheet

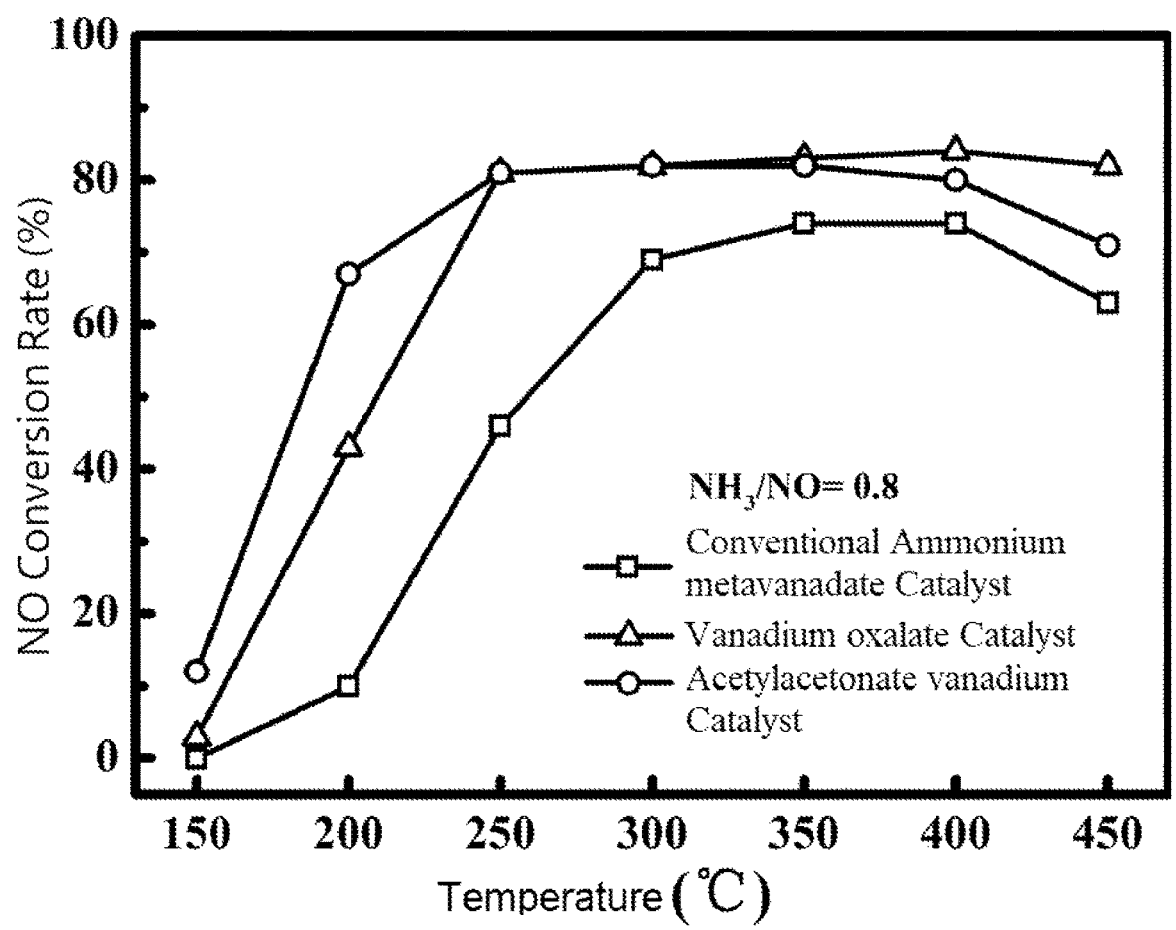

PREPARATION METHOD OF DENITRATION CATALYST WITH WIDE OPERATING TEMPERATURE RANGE FOR FLUE GAS

BACKGROUND OF THE PRESENT INVENTION

Field of Invention

The present invention the technical field of nitrogen oxide control in environmental protection, and particularly relates to a preparation method of denitration catalyst with wide operating temperature range for flue gas and its application thereof.

Description of Related Arts

Nitrogen oxides (NOx) are one of the major pollutants in global air pollution, causing environmental problems such as photochemical smog, acid rain and ozone layer damage, which seriously affect people's living environment and quality of life, and have aroused widespread concerns in countries around the world. For fixed source and mobile source combustion emissions, countries are setting increasingly stringent emission standards. Ammonia selective catalytic reduction (NH3-SCR) with NH3 as a reducing agent has been widely used in the removal of NOx from coal-fired power plants, industrial boilers, diesel exhausts, etc. $V_2O_5$—$WO_3/TiO_2$ is a widely used commercial SCR catalyst, which has an active temperature window of 300-400° C. Unlike other developed countries, 30% of industrial boilers in China, such as waste incinerators, heating boilers, cement kilns and sintering kilns, etc., have an exhaust gas temperature of 150-300° C. Also, when the power plant boiler is working at low load, the flue gas outlet temperature is usually lower than 300° C. Accordingly, processing denitration with existing commercial catalysts does not meet emission standards. Because of the above reason, NOx from low-temperature flue gas from these industrial boilers has not been effectively removed and regulated.

However, such emission problems can no longer be ignored. China has formulated increasingly stringent emission standards. Starting on Jan. 1, 2012, the "Emission Standards for Thermal Pollutants in Thermal Power Plants" (GB13223-2011) has been implemented. From Jul. 1, 2014, the national standards require that the maximum allowable NOx emission limit of existing thermal power boilers is 100 mg/Nm$^3$. It is worth noting that it is very costly and unrealistic to update and replace these coal-fired industrial boilers with high NOx emissions. Therefore, in order to reduce the NOx emissions of the above industrial boilers, a feasible solution is to develop a low-cost SCR denitration catalyst with a wide operating temperature window.

SUMMARY OF THE PRESENT INVENTION

In order to overcome the disadvantages of the existing arts described above, an object of the present invention is to provide a preparation method of denitration catalyst with wide operating temperature range for flue gas and its application thereof, which utilizes titanium white powder or titanium tungsten powder as a carrier and organic vanadium compound as a vanadium precursor to prepare and obtain Ammonia gas selective catalytic reduction (NH$_3$-SCR) catalyst powder. The catalyst is applicable to flue gas conditions with wide operating temperature (200-500° C.) and has high denitration rate while no solvents or other additives is required, therefore is more environmentally friendly, has effectively reduced manufacturing costs and is a denitration catalyst preparation technology that is more conducive to industrial production.

In order to achieve the above object, the present invention is implemented by the following technical solutions:

A preparation method of denitration catalyst with wide operating temperature range for flue gas, which comprises the steps of: using an organic vanadium compound as a vanadium precursor, a titanium white powder or a titanium tungsten powder as a carrier, and carrying out mechanical ball milling and heating treatment.

The organic vanadium compound is one or two of vanadyl oxalate and vanadyl acetylacetonate.

In the carrier of titanium tungsten powder, a content of tungsten trioxide is 3-10 wt. %.

The denitration catalyst has an active component of vanadium pentoxide.

The vanadium precursor used is based on the vanadium pentoxide being produced so that a content of vanadium pentoxide in the denitration catalyst is 1-10 wt. %.

The preparation method comprises the following steps:

Step 1: initially mixing the carrier and the vanadium precursor, then adding to a ball mill tank for the mechanical ball milling for 30-120 min with a rotation speed of 20-80 rpm;

Step 2: processing the heating treatment to obtain the SCR denitration catalyst powder with wide operating temperature range, that the heating treatment comprises drying and roasting processes, which includes:

(1) drying process: drying inside an oven at 110° C. for 8 hours;

(2) roasting in a muffle furnace:

rapid temperature rise: at room temperature, rapid temperature rise at 10° C./min to 110° C.;

slow temperature rise slow temperature rise at 2° C./min to 300° C.;

rapid temperature rise at 10° C./min to 500° C. and maintain at 500° C. for 4 hours;

finally, natural cooling with the muffle furnace to obtain a final product of SCR denitration catalyst with wide operating temperature range.

According to the present invention, the denitration catalyst with wide operating temperature range for flue gas prepared by the method of the present invention can be applied in removal of nitrogen oxide in fixed source flue gas. During application, the preferred reaction conditions are: temperature 150-450° C., atmospheric pressure, space velocity 60,000 flue gas concentration: NO 500 ppm, NH$_3$ 400 or 500 ppm, O$_2$ 5 vol. %.

Compared with the existing arts, the present invention has the following advantageous technical effects:

1. The invention employs organic vanadium compound as the vanadium precursor for the preparation of catalyst, that the vanadium surface atom concentration of the catalyst surface is higher, the species of polymeric vanadium are more, and the reduction temperature of the vanadium oxide is lower, thereby obtaining SCR denitration catalyst with higher denitrification activity at low temperature and excellent resistance to sulfur and water poisoning.

2. The denitration catalyst with wide operating temperature range of the present invention only includes minor modifications to the traditional vanadium tungsten titanium catalyst system but adopts the mechanical ball milling method, the activity and resistance to sulfur and water poisoning are obviously improved, thus providing a preparation technology of SCR denitration powder catalyst which is green, highly efficient, low cost and simple in operation.

In summary, the Ammonia gas selective catalytic reduction ($NH_3$-SCR) catalyst powder with wide operating temperature window of the present invention is suitable for denitration of fixed source flue gas at a wide operating temperature range (200-450° C.). Through the interaction of the organic vanadium precursor with the carrier, the vanadium surface atom concentration of the catalyst is higher, the species of polymeric vanadium is more, and the vanadium oxide is more easily reduced, thereby obtaining higher denitrification activity at low temperature. The denitration catalyst with wide operating temperature range for flue gas of the present invention has relatively higher activity at 200-450° C. while having good resistance to sulfur and water poisoning.

BRIEF DESCRIPTION OF THE DRAWINGS

FIG. 1 is a schematic diagram showing a denitration efficiency of the catalyst in powdered form obtained in the embodiments of the present invention.

DETAILED DESCRIPTION OF THE PREFERRED EMBODIMENT

The present invention is described in further detail below with reference to specific embodiments.

Embodiment 1

A preparation method of denitration catalyst with wide operating temperature range for flue gas Step 1: initially mixing of 98 g titanium tungsten powder and 3.4 g vanadium oxalate, then adding to a ball mill tank for the mechanical ball milling for 30 min with a rotation speed of 40 rpm to obtained a ball milled mixture;

Step 2: taking out the ball milled mixture and drying at 110° C. for 8 hours, then roasting in an air atmosphere: at room temperature, rapid temperature rise at 10° C./min to 110° C.; slow temperature rise slow temperature rise at 2° C./min to 300° C.; rapid temperature rise at 10° C./min to 500° C. and maintain at 500° C. for 4 hours; and finally natural cooling with the muffle furnace to obtain a SCR denitration catalyst with wide operating temperature range in powdered form.

FIG. 1 shows the results of denitration activity test of the catalyst. Test conditions: the catalyst powder is pressed into a tablet, crushed and sieved, catalyst particles of 50-100 mesh is selected for denitration activity evaluation, 1.0 g catalyst, NO 500 ppm, $NH_3$ 400 ppm, $O_2$ 5 vol. %, $N_2$ balance, total flue gas flow rate is 1 L/min, gas airspeed GHSV 60,000 $h^{-1}$ (standard condition).

It can be seen from the test results that as the reaction temperature increases, the denitration efficiency of the vanadyl oxalate catalyst first increases and then remains at 80%, and the denitration efficiency is higher than that of the conventional ammonium metavanadate catalyst, the advantage is especially significant at the low temperature to reaction window (<300° C.).

Embodiment 2

A preparation method of denitration catalyst with wide operating temperature range for flue gas Step 1: initially mixing of 98 g titanium tungsten powder and 6.0 g acetylacetonate vanadium, then adding to a ball mill tank for the mechanical ball milling for 40 min with a rotation speed of 30 rpm to obtained a ball milled mixture;

Step 2: taking out the ball milled mixture and drying at 110° C. for 8 hours, then roasting in an air atmosphere: at room temperature, rapid temperature rise at 10° C./min to 110° C.; slow temperature rise slow temperature rise at 2° C./min to 300° C.; rapid temperature rise at 10° C./min to 500° C. and maintain at 500° C. for 4 hours; and finally natural cooling with the muffle furnace to obtain a SCR denitration catalyst with wide operating temperature range in powdered form.

FIG. 1 shows the results of denitration activity test of the catalyst. Test conditions: the catalyst powder is pressed into a tablet and then crushed and sieved, catalyst particles of 50-100 mesh is selected for denitration activity evaluation, 1.0 g catalyst, NO 500 ppm, $NH_3$ 400 ppm, $O_2$ 5 vol. %, $N_2$ balance, total flue gas flow rate is 1 L/min, gas airspeed GHSV 60,000 $h^{-1}$ (standard condition).

It can be seen from the test results that the denitration activity of the vanadium acetylacetonate catalyst is higher than that of other catalysts, and has excellent denitration performance.

What is claimed is:

1. A preparation method of denitration catalyst with wide operating temperature range for flue gas, characterized in that: the preparation method comprises the steps of:

initially mixing a titanium dioxide powder or a titanium tungsten powder as a carrier and an organic vanadium compound as a vanadium precursor, then adding to a ball mill tank for carrying out mechanical ball milling for 30-120 mins with a rotation speed of 20-80 rpm; and carrying out drying and roasting processes to obtain the SCR denitration catalyst powder with wide temperature range, wherein said drying process comprises the step of drying in an oven at 110° C. for 8 hours; and said roasting process comprises the steps of: roasting in a muffle furnace: first by a rapid temperature rise method in which a rapid temperature rise at room temperature at 10° C./min to 110° C. is carried out; then by a slow temperature rise method in which a slow temperature rise at 2° C./min to 300° C. is carried out; and by a rapid temperature rise method in which a rapid temperature rise at 10° C./min to 500° C. is carried out and maintain at 500° C. for 4 hours; and finally natural cooling with the muffle furnace to obtain a final product of SCR denitration catalyst with wide temperature range.

* * * * *